US010267191B2

(12) United States Patent
Julien et al.

(10) Patent No.: US 10,267,191 B2
(45) Date of Patent: Apr. 23, 2019

(54) TURBOPROP ENGINE ASSEMBLY WITH COMBINED ENGINE AND COOLING EXHAUST

(71) Applicant: PRATT & WHITNEY CANADA CORP., Longueuil (CA)

(72) Inventors: Andre Julien, Ste-Julie (CA); Jean Thomassin, Ste-Julie (CA); Serge Dussault, Ste-Julie (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 153 days.

(21) Appl. No.: 15/227,506

(22) Filed: Aug. 3, 2016

(65) Prior Publication Data

US 2017/0037756 A1    Feb. 9, 2017

Related U.S. Application Data

(60) Provisional application No. 62/202,275, filed on Aug. 7, 2015.

(51) Int. Cl.
*F01N 3/05* (2006.01)
*F02K 1/38* (2006.01)
(Continued)

(52) U.S. Cl.
CPC ............. *F01N 3/055* (2013.01); *B64D 27/02* (2013.01); *B64D 27/08* (2013.01); *B64D 27/10* (2013.01);
(Continued)

(58) Field of Classification Search
CPC ......... F01N 3/055; B64D 27/02; B64D 27/08; B64D 27/10; B64D 33/04; B64D 33/10;
(Continued)

(56) References Cited

U.S. PATENT DOCUMENTS 2,164,545 A    7/1939    Rogers
2,593,541 A    4/1952    Cowdrey et al.
(Continued)

FOREIGN PATENT DOCUMENTS

CN    102673793    9/2012
FR      864010      4/1941
(Continued)

OTHER PUBLICATIONS

Office Action issued in related U.S. Appl. No. 15/227,519.
Office Action issued in related U.S. Appl. No. 15/227,483.

*Primary Examiner* — Laert Dounis
*Assistant Examiner* — Kelsey L Stanek
(74) *Attorney, Agent, or Firm* — Norton Rose Fulbright Canada LLP

(57) ABSTRACT

A turboprop engine assembly for an aircraft, including an internal combustion engine having a liquid coolant system, an air duct in fluid communication with an environment of the aircraft, a heat exchanger received within the air duct having coolant passages in fluid communication with the liquid coolant system and air passages air passages in fluid communication with the air duct, and an exhaust duct in fluid communication with an exhaust of the internal combustion engine. The exhaust duct has an outlet positioned within the air duct downstream of the heat exchanger and upstream of an outlet of the air duct, the outlet of the exhaust duct spaced inwardly from a peripheral wall of the air duct. In use, a flow of cooling air surrounds a flow of exhaust gases. A method of discharging air and exhaust gases in an turboprop engine assembly having an internal combustion engine is also discussed.

20 Claims, 4 Drawing Sheets

(51) Int. Cl.

| | | |
|---|---|---|
| *F02B 53/14* | (2006.01) | |
| *F02C 5/00* | (2006.01) | |
| *F02C 6/20* | (2006.01) | |
| *F02C 7/18* | (2006.01) | |
| *B64D 27/02* | (2006.01) | |
| *B64D 27/08* | (2006.01) | |
| *B64D 33/10* | (2006.01) | |
| *B64D 27/10* | (2006.01) | |
| *B64D 33/04* | (2006.01) | |
| *F01N 13/08* | (2010.01) | |
| *F02B 61/04* | (2006.01) | |
| *F02B 53/00* | (2006.01) | |

(52) U.S. Cl.
CPC ............ *B64D 33/04* (2013.01); *B64D 33/10* (2013.01); *F01N 13/082* (2013.01); *F02B 53/14* (2013.01); *F02B 61/04* (2013.01); *F02C 5/00* (2013.01); *F02C 6/206* (2013.01); *F02C 7/18* (2013.01); *F02K 1/386* (2013.01); *F01N 2260/022* (2013.01); *F01N 2270/02* (2013.01); *F02B 2053/005* (2013.01); *F05D 2260/213* (2013.01); *Y02T 50/672* (2013.01); *Y02T 50/676* (2013.01)

(58) Field of Classification Search
CPC .. F02B 53/14; F02B 61/04; F02C 5/00; F02C 6/206; Y02T 50/672; Y02T 50/676; F02K 1/286
USPC .......................................................... 60/321
See application file for complete search history.

(56) References Cited

U.S. PATENT DOCUMENTS

| | | | |
|---|---|---|---|
| 4,815,282 A | | 3/1989 | Wilkinson et al. |
| 5,012,646 A | | 2/1991 | Speer |
| 5,265,408 A | | 11/1993 | Sheoran et al. |
| 5,284,012 A | | 2/1994 | Laborie et al. |
| 5,528,901 A | | 6/1996 | Willis |
| 5,655,359 A | | 8/1997 | Campbell et al. |
| 5,692,372 A | | 12/1997 | Whurr |
| 5,730,089 A | * | 3/1998 | Morikawa ......... B60H 1/00885 123/41.14 |
| 5,987,877 A | | 11/1999 | Steiner |
| 6,282,881 B1 | * | 9/2001 | Beutin .................. B64D 33/10 184/6.11 |
| 6,430,931 B1 | | 8/2002 | Horner |
| 6,606,854 B1 | | 8/2003 | Siefker et al. |
| 6,615,576 B2 | | 9/2003 | Sheoran et al. |
| 6,651,929 B2 | | 11/2003 | Dionne |
| 6,668,553 B1 | | 12/2003 | Ghizawi |
| 7,412,831 B2 | | 8/2008 | Ullyott |
| 7,836,680 B2 | | 11/2010 | Schwarz et al. |
| 8,480,460 B2 | | 7/2013 | Schwartz |
| 9,027,345 B2 | | 5/2015 | Julien |
| 9,771,165 B2 | | 9/2017 | Ullyott et al. |
| 2003/0074895 A1 | | 4/2003 | McFarland |
| 2003/0080244 A1 | | 5/2003 | Dionne |
| 2005/0268593 A1 | | 12/2005 | Hagshenas |
| 2006/0016196 A1 | | 1/2006 | Epstein |
| 2006/0016197 A1 | | 1/2006 | Epstein |
| 2007/0145745 A1 | | 6/2007 | Woods et al. |
| 2007/0240415 A1 | | 10/2007 | Julien et al. |
| 2008/0277533 A1 | | 11/2008 | Schwartz et al. |
| 2008/0314573 A1 | | 12/2008 | Schwartz et al. |
| 2009/0007882 A1 | | 1/2009 | Lents et al. |
| 2009/0078496 A1 | | 3/2009 | Francisco et al. |
| 2009/0088063 A1 | | 4/2009 | Schwarz |
| 2009/0217643 A1 | | 9/2009 | Sokhey et al. |
| 2013/0214091 A1 | | 8/2013 | Hillel |
| 2014/0020380 A1 | * | 1/2014 | Thomassin ............... F02C 6/20 60/605.1 |
| 2014/0159378 A1 | | 6/2014 | Wright |
| 2014/0360445 A1 | | 12/2014 | Reynolds et al. |
| 2015/0267555 A1 | * | 9/2015 | Plante .................. B64D 29/06 415/119 |
| 2016/0376022 A1 | | 12/2016 | Ullyott et al. |
| 2016/0376981 A1 | | 12/2016 | Ullyott et al. |
| 2017/0036775 A1 | | 2/2017 | Jones et al. |
| 2017/0037756 A1 | | 2/2017 | Julien et al. |
| 2017/0037775 A1 | | 2/2017 | Jones et al. |
| 2017/0037776 A1 | | 2/2017 | Jones et al. |
| 2017/0226959 A1 | | 8/2017 | Julien et al. |
| 2017/0267370 A1 | | 9/2017 | Ullyott et al. |
| 2018/0091032 A1 | | 3/2018 | Williams |

FOREIGN PATENT DOCUMENTS

| | | |
|---|---|---|
| GB | 622768 | 5/1949 |
| JP | 06107295 | 4/1994 |
| WO | 8910300 | 11/1989 |
| WO | 03037715 | 5/2003 |

* cited by examiner

TURBOPROP ENGINE ASSEMBLY WITH COMBINED ENGINE AND COOLING EXHAUST

CROSS-REFERENCE TO RELATED APPLICATIONS

This application claims priority from U.S. application No. 62/202,275 filed Aug. 7, 2015, the entire contents of which are incorporated by reference herein.

TECHNICAL FIELD

The application relates generally to compound engine assemblies and, more particularly, to such assemblies configured as turboprop engines.

BACKGROUND OF THE ART

Turboprop engine typically have an engine exhaust which is directed to the environment of the aircraft, typically through an exhaust duct and stub to mix it with ambient air. Such an exhaust stub usually creates drag for the engine.

Ducts and other structure in contact with the exhaust flow must typically be made of materials able to withstand significantly high temperatures. Such materials typically represent significant costs.

SUMMARY

In one aspect, there is provided a turboprop engine assembly for an aircraft, the turboprop engine assembly comprising: an internal combustion engine having a liquid coolant system, the internal combustion engine drivingly engaged to a propeller; an air duct in fluid communication with an environment of the aircraft; a heat exchanger received within the air duct, the heat exchanger having coolant passages in fluid communication with the liquid coolant system and air passages in heat exchange relationship with the coolant passages, the air passages in fluid communication with the air duct; and an exhaust duct in fluid communication with an exhaust of the internal combustion engine, the exhaust duct having an outlet positioned within the air duct downstream of the heat exchanger and upstream of an outlet of the air duct, the outlet of the exhaust duct spaced inwardly from a peripheral wall of the air duct.

In another aspect, there is provided a turboprop engine assembly for an aircraft, the turboprop engine assembly comprising: an internal combustion engine having a liquid coolant system, the internal combustion engine drivingly engaged to a propeller; a turbine section having an inlet in fluid communication with an outlet of the internal combustion engine, the turbine section including at least one turbine compounded with the internal combustion engine; an air duct having an inlet positioned aft of the propeller and an outlet positioned aft of the inlet, the inlet and outlet both in fluid communication with the an environment of the aircraft; a heat exchanger in fluid communication with the liquid coolant system and located in the air duct, at least part of a fluid communication between the inlet and outlet of the air duct being performed through the heat exchanger; and an exhaust duct in fluid communication with an exhaust of the turbine section, the exhaust duct having an outlet positioned within the air duct downstream of the fan and upstream of the outlet of the air duct, the outlet of the exhaust duct spaced inwardly from a peripheral wall of the air duct so that, in use, a flow of cooling air through the air duct surrounds a flow of exhaust gases out of the exhaust duct, an open cross-sectional area of the outlet of the exhaust duct being smaller than an open cross-sectional area of the air duct around the outlet of the exhaust duct.

In a further aspect, there is provided a method of discharging air and exhaust gases in an turboprop engine assembly having an internal combustion engine, the method comprising: circulating a flow of cooling air used to cool a liquid coolant of the internal combustion engine to an air duct of the turboprop engine assembly and out of the turboprop engine assembly; and circulating a flow of exhaust gases produced by the internal combustion engine to the air duct so that the flow of cooling air surrounds the flow of exhaust gases, a mass flow the exhaust gases being smaller than a mass flow of the cooling air.

DESCRIPTION OF THE DRAWINGS

Reference is now made to the accompanying figures in which.

DETAILED DESCRIPTION

Figure 1:
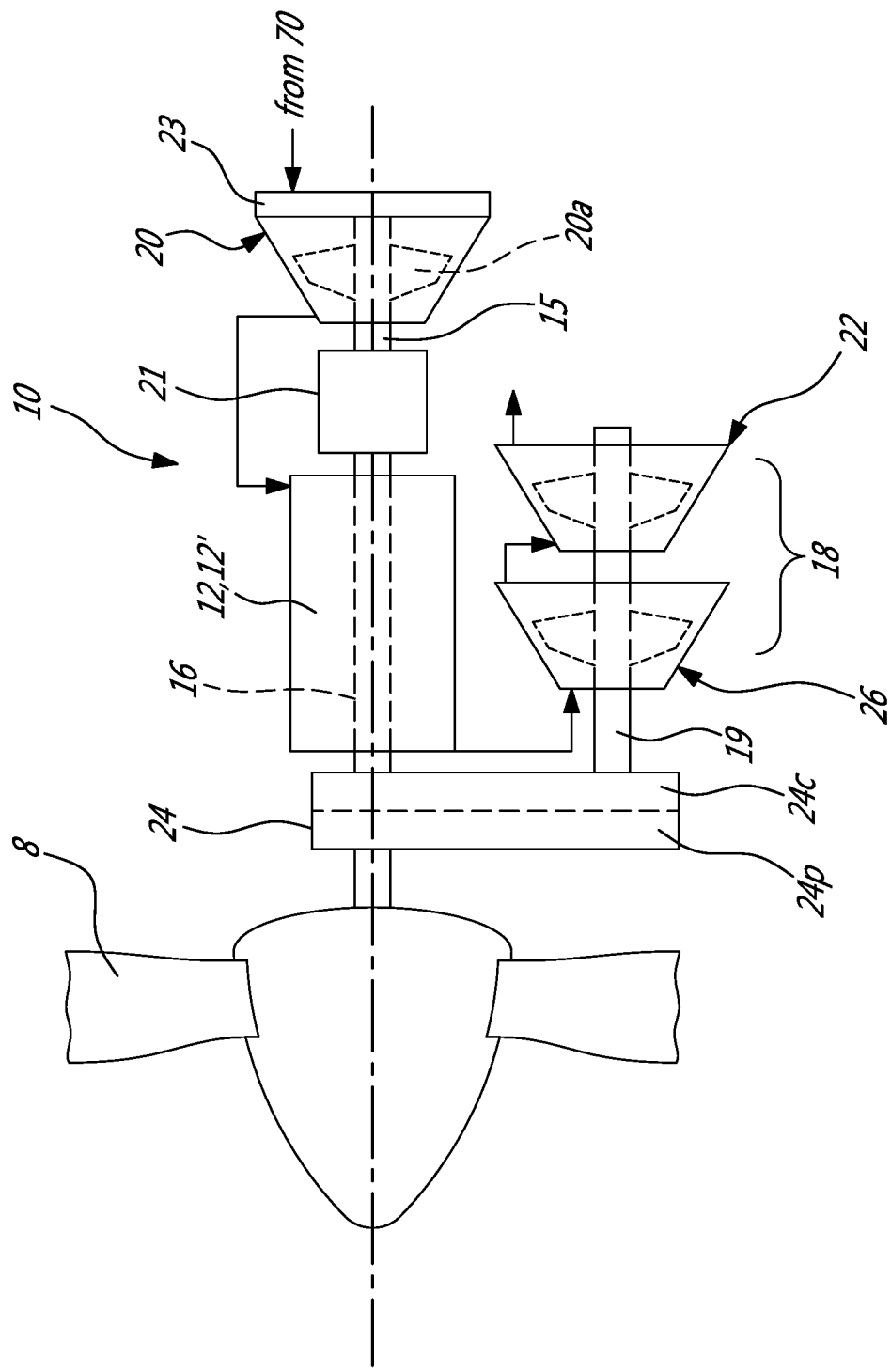
FIG. 1 is a schematic view of a compound engine assembly in accordance with a particular embodiment.

FIG. 1 illustrates a compound engine assembly 10 which is configured as a turboprop engine, in accordance with a particular embodiment. In the embodiment shown, the compound engine assembly 10 includes a liquid cooled heavy fueled multi-rotor rotary intermittent combustion engine core 12'. As will be detailed below, other configurations for the engine core 12' are also possible.

The engine core 12' has an engine shaft 16 driven by the internal combustion engine(s) 12 and driving a rotatable load, which is shown here as a propeller 8. It is understood that the compound engine assembly 10 may alternately be configured to drive any other appropriate type of load, including, but not limited to, one or more generator(s), drive shaft(s), accessory(ies), rotor mast(s), compressor(s), or any other appropriate type of load or combination thereof. The compound engine assembly 10 further includes a compressor 20, and a turbine section 18 compounding power with the engine core 12'.

In the embodiment shown, the engine core 12' includes 2 or more rotary intermittent internal combustion engine(s) 12 drivingly engaged to the shaft 16. In another embodiment, the engine core 12' includes a single engine. Each rotary engine 12 has a rotor sealingly engaged in a respective housing, with each rotary engine having a near constant volume combustion phase for high cycle efficiency. The intermittent internal combustion engine(s) 12 may be Wankel engine(s).

Figure 2:
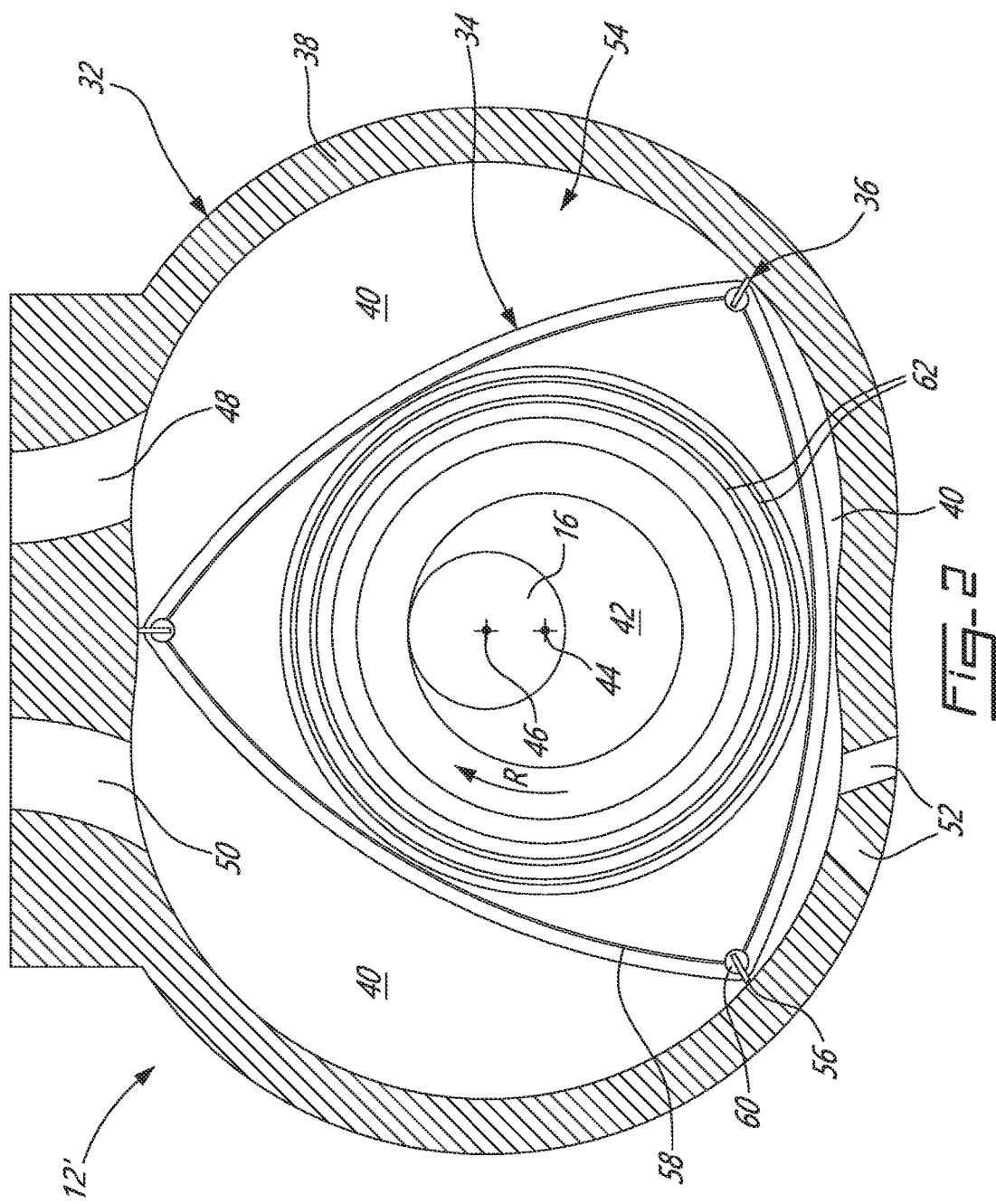
FIG. 2 is a cross-sectional view of a Wankel engine which can be used in a compound engine assembly such as shown in FIG. 1, in accordance with a particular embodiment.

Referring to FIG. 2, an example of a Wankel engine 12 which may be used in the engine core 12' is shown. It is understood that the configuration of the engine(s) 12, e.g. placement of ports, number and placement of seals, etc., may vary from that of the embodiment shown. The engine 12 comprises a housing 32 defining a rotor cavity having a profile defining two lobes, which is preferably an epitrochoid. A rotor 34 is received within the rotor cavity. The rotor defines three circumferentially-spaced apex portions 36, and a generally triangular profile with outwardly arched sides. The apex portions 36 are in sealing engagement with the inner surface of a peripheral wall 38 of the housing 32 to form and separate three working chambers 40 of variable volume between the rotor 34 and the housing 32. The peripheral wall 38 extends between two axially spaced apart end walls 54 to enclose the rotor cavity.

The rotor 34 is engaged to an eccentric portion 42 of the output shaft 16 to perform orbital revolutions within the rotor cavity. The output shaft 16 performs three rotations for each orbital revolution of the rotor 34. The geometrical axis 44 of the rotor 34 is offset from and parallel to the axis 46 of the housing 32. During each orbital revolution, each chamber 40 varies in volume and moves around the rotor cavity to undergo the four phases of intake, compression, expansion and exhaust.

An intake port 48 is provided through the peripheral wall 38 for admitting compressed air into one of the working chambers 40. An exhaust port 50 is also provided through the peripheral wall 38 for discharge of the exhaust gases from the working chambers 40. Passages 52 for a spark plug, glow plug or other ignition mechanism, as well as for one or more fuel injectors of a fuel injection system (not shown) are also provided through the peripheral wall 38. Alternately, the intake port 48, the exhaust port 50 and/or the passages 52 may be provided through the end or side wall 54 of the housing. A subchamber (not shown) may be provided in communication with the chambers 40, for pilot or pre injection of fuel for combustion.

For efficient operation the working chambers 40 are sealed by spring-loaded peripheral or apex seals 56 extending from the rotor 34 to engage the inner surface of the peripheral wall 38, spring-loaded face or gas seals 58 and end or corner seals 60 extending from the rotor 34 to engage the inner surface of the end walls 54. The rotor 34 also includes at least one spring-loaded oil seal ring 62 biased against the inner surface of the end wall 54 around the bearing for the rotor 34 on the shaft eccentric portion 42.

The fuel injector(s) of the engine 12, which in a particular embodiment are common rail fuel injectors, communicate with a source of Heavy fuel (e.g. diesel, kerosene (jet fuel), equivalent biofuel), and deliver the heavy fuel into the engine 12 such that the combustion chamber is stratified with a rich fuel-air mixture near the ignition source and a leaner mixture elsewhere.

Referring back to FIG. 1, in the embodiment shown the engine core 12' is supercharged with the compressor 20 mounted in-line with the engine core 12', i.e. the compressor rotor(s) 20a rotate co-axially with the engine shaft 16. In the embodiment shown, the compressor rotor(s) 20a are engaged on a compressor shaft 15, and the engine shaft 16 is in driving engagement with the compressor shaft 15 through a step-up gearbox 21, which may include for example a planetary gear system.

In the embodiment shown and referring particularly to FIG. 1, the compressor 20 is a centrifugal compressor with a single rotor 20a. Other configurations are alternately possible. The compressor 20 may be single-stage device or a multiple-stage device and may include one or more rotors having radial, axial or mixed flow blades.

The outlet of the compressor 20 is in fluid communication with the inlet of the engine core 12' (e.g. intake port 48 of each engine 12). Accordingly, air enters the compressor 20 and is compressed and circulated to the inlet of the engine core 12'. In a particular embodiment, the compressor 20 includes variable inlet guide vanes 23 through which the air circulates before reaching the compressor rotor(s) 20a. Although not shown, the air from the compressor 20 may circulate through an intercooler to drop its temperature prior to entering the engine core 12'.

In the engine core 12' the compressed air is mixed with fuel and combusted to provide power and a residual quantity of intermediate pressure exhaust gas. Mechanical power produced by the engine core 12' drives the propeller 8.

Each engine 12 of the engine core 12' provides an exhaust flow in the form of exhaust pulses of high pressure hot gas exiting at high peak velocity. The outlet of the engine core 12' (e.g. the exhaust port 50 of each engine 12) is in fluid communication with the inlet of the turbine section 18, and accordingly the exhaust flow from the engine core 12' is supplied to the turbine section 18.

The turbine section 18 includes at least one rotor engaged on a turbine shaft 19. Mechanical energy recovered by the turbine section 18 is compounded with that of the engine shaft 16 to drive the propeller 8. In the embodiment shown, the turbine section 18 is compounded with the engine core 12' by the turbine shaft 19 being mechanically linked to, and in driving engagement with, the engine shaft 16 through a reduction gearbox 24, for example through an offset gear train with idler gear. The engine shaft 16 is also mechanically linked to, and in driving engagement with, the propeller 8 through the same reduction gearbox 24. In a particular embodiment, the reduction gearbox 24 includes two gear train branches: a compounding branch 24c mechanically linking the turbine shaft 19 and the engine shaft 16 and a downstream planetary branch 24p mechanically linking the engine shaft 16 and propeller 8. In another embodiment, the turbine shaft 19 and engine shaft 16 may be engaged to the propeller 8 through different gearboxes, or the turbine shaft 19 may be engaged to the engine shaft 16 separately from the engagement between the engine shaft 16 and the propeller 8.

The turbine section 18 may include one or more turbine stages. In the embodiment shown, the turbine section 18 includes a first stage turbine 26 receiving the exhaust from the engine core 12', and a second stage turbine 22 receiving the exhaust from the first stage turbine 26, with the turbines 26, 22 having different reaction ratios from one another. The degree of reaction of a turbine can be determined using the temperature-based reaction ratio (equation 1) or the pressure-based reaction ratio (equation 2), which are typically close to one another in value for a same turbine, and which characterize the turbine with respect to "pure impulse" or "pure reaction" turbines:

$$\text{Reaction}(T) = \frac{(t_{S3} - t_{S5})}{(t_{S0} - t_{S5})} \quad (1)$$

$$\text{Reaction}(P) = \frac{(P_{S3} - P_{S5})}{(P_{S0} - P_{S5})} \quad (2)$$

where t is temperature and P is pressure, s refers to a static port, and the numbers refers to the location the temperature or pressure is measured: 0 for the inlet of the turbine vane (stator), 3 for the inlet of the turbine blade (rotor) and 5 for the exit of the turbine blade (rotor); and where a pure impulse turbine would have a ratio of 0 (0%) and a pure reaction turbine would have a ratio of 1 (100%).

In a particular embodiment, the first stage turbine 26 is configured to take benefit of the kinetic energy of the pulsating flow exiting the engine(s) 12 while stabilizing the flow and the second stage turbine 22 is configured to extract energy from the remaining pressure in the flow. Accordingly, in a particular embodiment the first stage turbine 26 has a lower reaction ratio (i.e. lower value) than that of the second stage turbine 22. In a particular embodiment, the first stage turbine 26 has a reaction ratio of 0.25 or lower (temperature or pressure based) or of 0.2 or lower (temperature or pressure based), and the second stage turbine 22 a reaction ratio higher than 0.25 (temperature or pressure based) and/or is a medium reaction pressure turbine. Other values are also possible.

Figure 3:
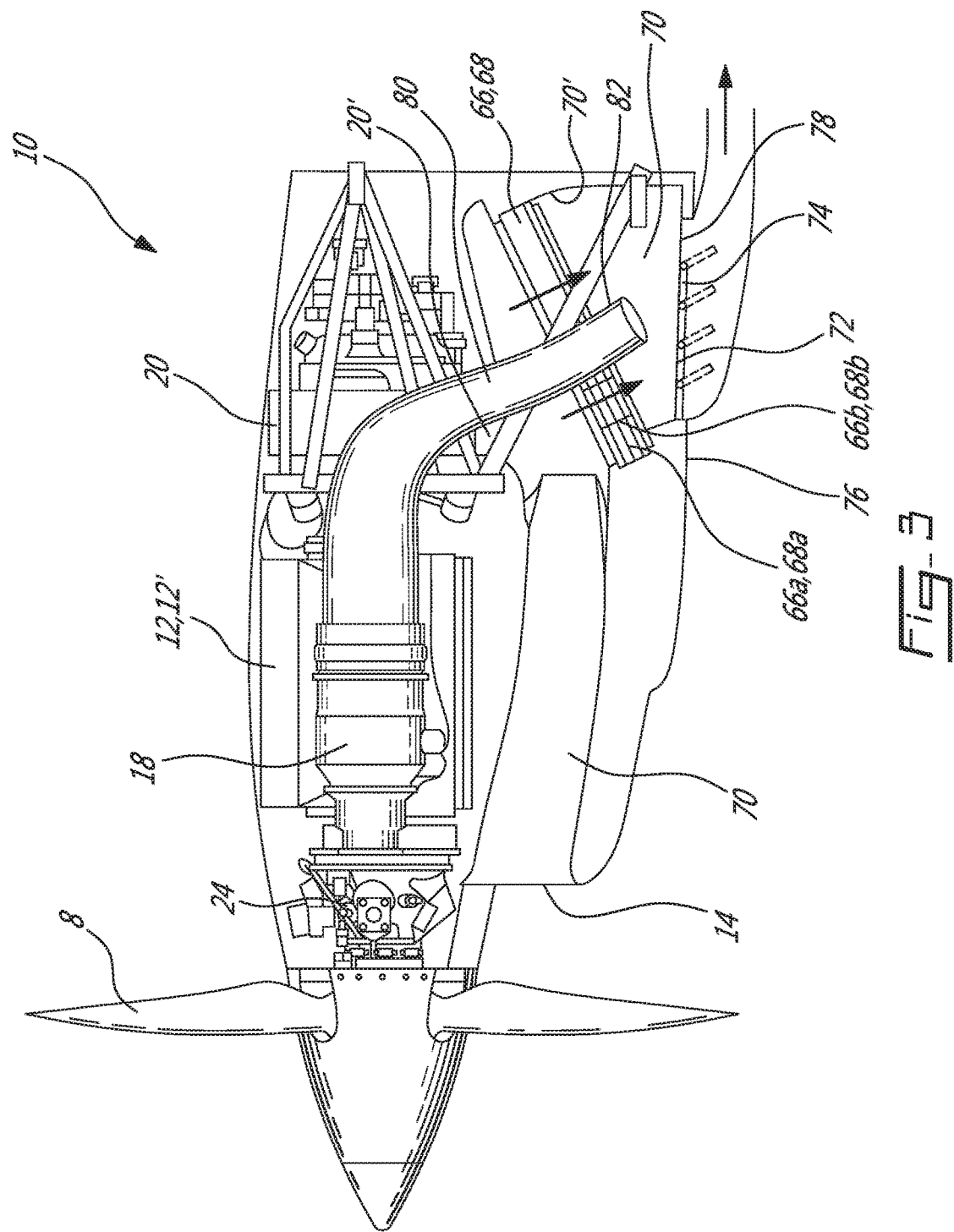
FIG. 3 is a schematic cross-sectional view of the compound engine assembly of FIG. 1, in accordance with a particular embodiment.

With a constant volume combustion cycle in the engine core 12' the breakdown of waste heat of the engine assembly 10 is different from a traditional gas turbine engine. Less heat is evacuated through the exhaust and more heat is given up to the engine casing. Accordingly, the engine(s) 12 have a coolant system, e.g. a liquid coolant system, which in a particular embodiment is distinct from any fuel and lubricating system of the engine assembly 10; in other words, a dedicated coolant is circulated through the engine(s) 12 of the engine core 12', for example through multiple coolant passages defined in the walls of the housing 32, and this dedicated coolant is circulated separately and independently from the lubricant and the fuel of the engine assembly 10, including the lubricant of the engine core 12'. The dedicated coolant may be a liquid coolant, for example water. Referring to FIG. 3, a heat exchanger 66 defining an engine core cooler includes coolant passages 66a in fluid communication with the coolant system of the engine core 12' and air passages 66b in heat exchange relationship with the coolant passages 66a.

Still referring to FIG. 3, the engine assembly 10 also includes a cooling and lubricating system, for circulating oil or any other liquid suitable for cooling and/or lubricating various components of the engine assembly 10 (e.g. bearings, gears, etc., of the engine core 12', the compressor 20, the turbines 22, 26, the gearboxes 21, 24). A second heat exchanger 68 defining an engine assembly cooler includes coolant passages 68a in fluid communication with the cooling and lubricating system of the engine assembly 10 and air passages 68b in heat exchange relationship with the coolant passages 68a.

In the embodiment shown, the nacelle installation of the compound engine assembly 10 includes a nacelle inlet 14 and an air duct 70 for the engine assembly 10 and the heat exchangers 66, 68. The air duct 70 extends from and communicates with the inlet 14, which is located at the front of the engine assembly 10 aft of the propeller 8. The inlet 14 is in communication with the environment of the aircraft, and is configured and positioned so as to be able to receive ram air during flight and flow from the propeller 8, particularly when on the ground. The air duct 70 also has an outlet 72 in communication with the environment of the aircraft, so as to discharge the spent cooling air from the air duct 70. In the embodiment shown, the outlet 72 is defined in a bottom surface of the engine assembly 10. Other configurations are also possible.

The inlet 20' of the compressor 20 is in fluid communication with the air duct 70, and the heat exchangers 66, 68 are received within the air duct 70. The heat exchangers 66, 68 extend across the air duct 70, such that the airflow through the air duct 70 circulates through the air passages 66b, 68b of the heat exchangers 66, 68, which are in fluid communication with the air duct 70. Although two heat exchangers 66, 68 are shown, it is understood that alternately a single heat exchanger or more than two heat exchangers may be provided in the air duct 70. The two heat exchangers 66, 68 are shown as being placed in parallel, such that a portion of the airflow separately circulates through each heat exchanger 66, 68. Alternately, the heat exchangers 66, 68 may be placed in the air duct 70 in series such that the same portion of the airflow circulates through one than through the other of the heat exchangers 66, 68, although such a configuration may necessitate the use of larger heat exchangers. It is also understood that the angle of the heat exchangers 66, 68 within the air duct 70 may be different from that shown. In a particular embodiment, the angle of the heat exchangers 66, 68 with respect to the airflow within the air duct 70 is selected to obtain a desired balance between pressure losses and effectiveness of the heat exchangers 66, 68, in consideration of the available space within the air duct 70.

In the embodiment shown, a part of the outlet 72 of the air duct 70 is selectively closable by a plurality of movable cowl flaps 74. The cowl flaps 74 are pivotally connected to an outer wall 76 of the air duct 70 downstream of the heat exchangers 66, 68, each adjacent a respective opening, or a respective part of the opening of the outlet 72, defined through the outer wall 76. The flaps 74 are movable between an extended position (shown in dotted lines) where they extend away from the respective opening and a retracted position (shown in full lines) where they close the respective opening, such as to modulate the airflow through the air duct 70 and heat exchangers 66, 68. In a particular embodiment, the cowl flaps 74 are positioned in accordance with the power demand on the engine assembly 10, such as to regulate the temperature of the oil and coolant being cooled in the heat exchangers 66, 68 while reducing or minimizing cooling drag; for example, the cowl flaps 74 are open at take-off and closed at cruise speed.

The cowl flaps 74 may have any appropriate configuration. For example, in a particular embodiment, the cowl flaps 74 have a straight airfoil shape; in another embodiment, the cowl flaps 74 have a cambered airfoil shape, configured to flow the exit air horizontally to produce a more effective thrust. In a particular embodiment, the cowl flaps 74 are configured as louvers, each connected to a rod, and an actuator slides the rod to pivot the cowl flaps 74 between the extended and retracted positions to open or close the louvers. Other configurations are also possible.

In the embodiment shown, the outlet 72 of the air duct 70 has a portion 78 remaining permanently open downstream of the cowl flaps 74. This portion 78 may be shaped to define a nozzle, to form an exit jet opening. In a particular embodiment, the configuration of the nozzle is optimized to minimize the drag induced by the heat exchangers 66, 68 at the cruise speed operating conditions.

Figure 4:
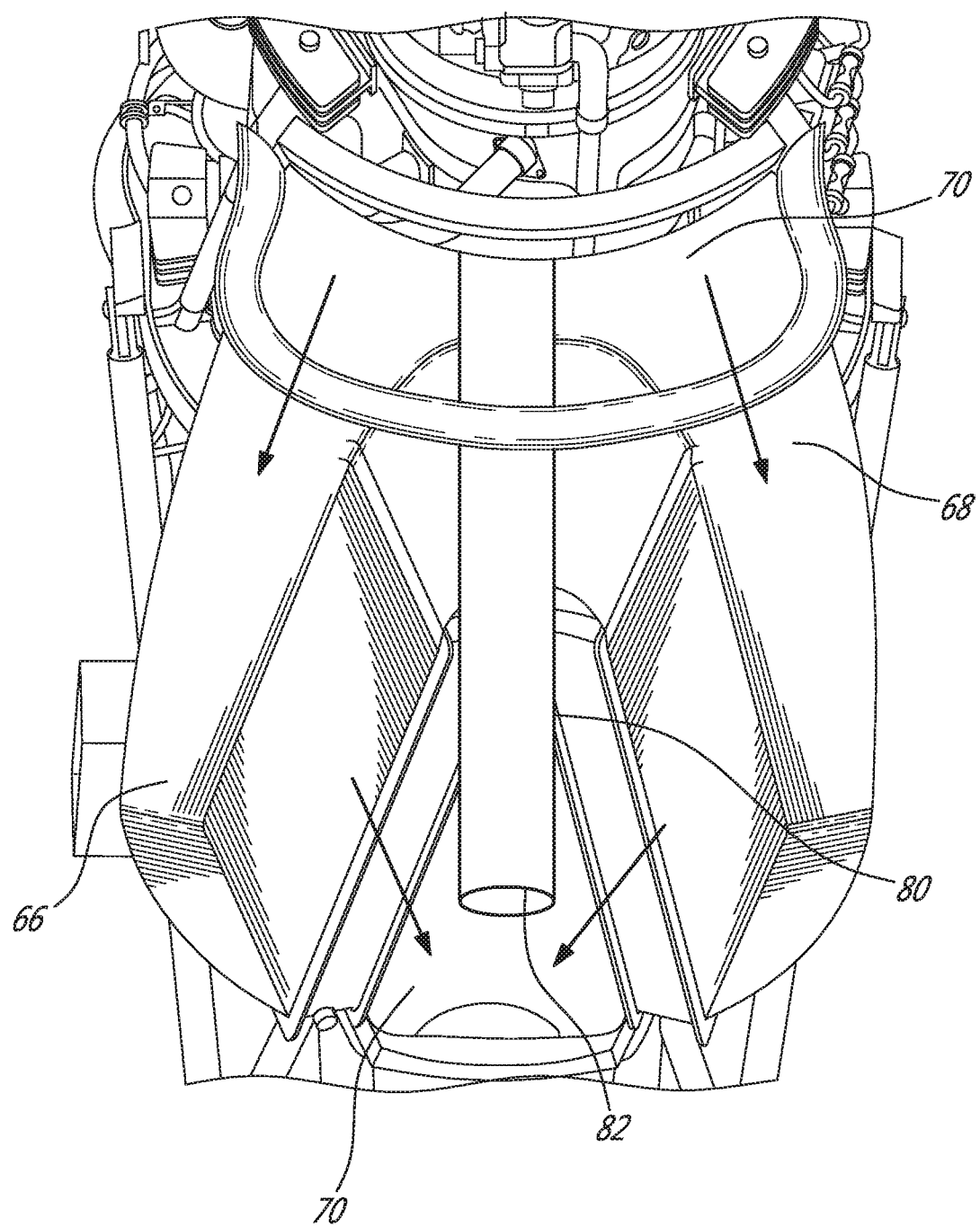
FIG. 4 is a schematic bottom tridimensional view of the compound engine assembly of FIG. 3.

Referring to FIGS. 3-4, an exhaust duct 80 extends in fluid communication with the exhaust of the engine core 12', by being connected to an exhaust of the turbine section 18. The exhaust duct 80 extends through a portion of the air duct 70 from a location upstream of the heat exchangers 66, 68 to a location downstream of the heat exchanger 66, 68. The exhaust duct 80 has an outlet 82 positioned in the air duct 70, downstream of the heat exchangers 66, 68 and upstream of the outlet 72 of the air duct 70. The outlet 82 of the exhaust duct 80 is spaced inwardly from a peripheral wall 70' of the air duct 70. The air and exhaust gases are thus discharged in the air duct 70 so that the flow of cooling air surrounds the flow of exhaust gases. The mass flow and/or volume of flow of exhaust gases is/are smaller than the flow of cooling air. In a particular embodiment, the mass flow of exhaust gases is 20% or less of the mass flow of cooling air. An open cross-sectional area of the outlet 82 of the exhaust duct 80 is smaller than an open cross-sectional area of the air duct 70 around the outlet 82 of the exhaust duct 80 (where "open cross-sectional area of the air duct 70" refers to the cross-sectional area of the air duct 70 not occupied by the exhaust duct 80). In a particular embodiment, the ratio of the diameter of the exhaust duct 80 on the diameter of the air duct 70 around the outlet of the exhaust duct 80 is from 0.2 to 0.4, for example around ⅓. Other values are also possible, depending for example on the optimisation of the weight and cost of the engine assembly 10 as a whole.

In a particular embodiment, the larger and cooler cooling air flow surrounding the exhaust gas flow protects the peripheral wall 70' of the air duct 70 from the exhaust flow, which allows for the peripheral wall 70' to be made of materials having a relatively low resistance to high temperature (for example, lower than that of nickel or titanium alloys), where "resistance to high temperature" refers to the ability of a material to keep their strength, rigidity and durability when submitted to high temperatures. For example, the temperature of the exhaust gases may be 800° F. or more, potentially up to 1200° F.-1400° F., while the cooling air flow temperature may be 250° F. or less; surrounding the exhaust gas flow with the cooling air flow thus provides some protection to the peripheral wall 70' from the high temperature of the exhaust flow. In a particular embodiment, the peripheral wall 70' of the air duct 70 is made of any suitable aluminum alloy, any suitable light metal alloy, any suitable composite material including, but not limited to, carbon fiber composite materials, or any suitable type of polymer.

In particular embodiment, the flow of exhaust gases expelled from the exhaust duct 80 has a higher velocity than the surrounding cooling air flow circulating in the air duct 70. In a particular embodiment, the difference in velocity is selected to create an entrainment effect in the cooling air flow, so as to help circulation of the cooling air flow through the heat exchangers 66, 68, which may be particularly, although not exclusively, useful when the aircraft is stationary.

Referring particularly to FIG. 4, in the embodiment shown the heat exchangers 66, 68 are disposed in parallel and spaced apart from one another in the air duct 70, and the exhaust duct 80 extends in the air duct 78 between the heat exchangers 66, 68. In a particular embodiment, such an arrangement allow for the creation of the entrainment effect in the cooling air flow. It is understood that any other suitable configuration and relative positions for the heat exchangers 66, 68 and the exhaust duct 80 may alternately be used. For example, a mixer (e.g. daisy style mixer) can be used at the intersection of the two flows.

In a particular embodiment, discharging of the exhaust flow in the cooling air flow allows to add energy to the discharged cooling air by increasing its average temperature; this may provide for acceleration of the expelled air via area reduction to produce useful thrust from the cooling air and/or reduce the overall cooling drag associated with the heat exchangers 66, 68.

In a particular embodiment, discharging of the exhaust flow in the cooling air flow allows for the elimination of the exhaust stub which is typically used at the exhaust flow exit. Such an exhaust flow usually causes additional drag, and accordingly elimination of this feature allows for a reduction of drag through having a combined exit port for all of the discharged flow.

In use and in accordance with a particular embodiment, the air and exhaust gases of the engine assembly 10 are thus discharged by circulating the flow of cooling air used to cool the liquid coolant of the engine(s) 12 to the air duct 70, and circulating the flow of exhaust gases produced by the engine(s) 12 to the air duct 70 so that the flow of cooling air surrounds the flow of exhaust gases, with a mass flow the exhaust gases being smaller than a mass flow of the cooling air. In a particular embodiment, the flow of exhaust gases is circulated from the engine(s) through the turbine section 18 compounded with the engine(s) before being circulated to the air duct 70.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A turboprop engine assembly for an aircraft, the turboprop engine assembly comprising:
   an internal combustion engine having a liquid coolant system, the internal combustion engine drivingly engaged to a propeller;
   an air duct in fluid communication with an environment of the aircraft;
   a heat exchanger received within the air duct, the heat exchanger having coolant passages in fluid communication with the liquid coolant system and air passages in heat exchange relationship with the coolant passages, the air passages in fluid communication with the air duct; and
   an exhaust duct in fluid communication with an exhaust of the internal combustion engine, the exhaust duct having an outlet positioned within the air duct downstream of the heat exchanger and upstream of an outlet of the air duct, the outlet of the exhaust duct spaced inwardly from a peripheral wall of the air duct, an annular space being defined between the exhaust duct and the peripheral wall of the air duct, the annular space having a cross-sectional area greater than that of the outlet of the exhaust duct.

2. The turboprop engine assembly as defined in claim 1, wherein the exhaust duct is in fluid communication with an exhaust of the internal combustion engine through a turbine section including at least one turbine compounded with the internal combustion engine.

3. The turboprop engine assembly as defined in claim 1, wherein the exhaust duct extends through a portion of the air duct from a location upstream of the heat exchanger to a location downstream of the heat exchanger.

4. The turboprop engine assembly as defined in claim 1, wherein at least part of the outlet of the air duct is selectively closable by a plurality of movable flaps.

5. The turboprop engine assembly as defined in claim 1, wherein the peripheral wall of the air duct is made of a material selected from a group consisting of: an aluminum alloy, a composite material, and a polymer.

6. The turboprop engine assembly as defined in claim 1, further comprising an additional heat exchanger received within the air duct, the additional heat exchanger having additional coolant passages in fluid communication with a cooling and lubricating system of the turboprop engine assembly and additional air passages in heat exchange relationship with the additional coolant passages and in fluid communication with the air duct, the liquid coolant system of the internal combustion engine being distinct from the cooling and lubricating system of the turboprop engine assembly.

7. The turboprop engine assembly as defined in claim 6, wherein the heat exchanger and the additional heat exchanger are disposed in parallel in the air duct, and the exhaust duct extends in the air duct between the heat exchanger and the additional heat exchanger.

8. The turboprop engine assembly as defined in claim 1, wherein the internal combustion engine is a Wankel rotary engine including a rotor having three apex portions mounted for eccentric revolutions within an internal cavity defined in a housing, the internal cavity having an epitrochoid shape with two lobes.

9. The turboprop engine assembly as defined in claim 1, wherein a ratio of a diameter of the outlet of the exhaust duct on a diameter of the air duct in a plane transverse to the outlet of the exhaust duct is from 0.2 to 0.4.

10. A turboprop engine assembly for an aircraft, the turboprop engine assembly comprising:
   an internal combustion engine having a liquid coolant system, the internal combustion engine drivingly engaged to a propeller;
   a turbine section having an inlet in fluid communication with an outlet of the internal combustion engine, the turbine section including at least one turbine compounded with the internal combustion engine;
   an air duct having an inlet positioned aft of the propeller and an outlet positioned aft of the inlet, the inlet and outlet both in fluid communication with an environment of the aircraft;
   a heat exchanger in fluid communication with the liquid coolant system and located in the air duct, at least part of a fluid communication between the inlet and outlet of the air duct being performed through the heat exchanger; and
   an exhaust duct in fluid communication with an exhaust of the turbine section, the exhaust duct having an outlet positioned within the air duct downstream of a fan and upstream of the outlet of the air duct, the outlet of the exhaust duct spaced inwardly from a peripheral wall of the air duct so that, in use, a flow of cooling air through the air duct surrounds a flow of exhaust gases out of the exhaust duct, an open cross-sectional area of the outlet of the exhaust duct being smaller than an open cross-sectional area of the air duct, the open cross-sectional area of the air duct being transverse to the flow of cooling air and surrounding radially the outlet of the exhaust duct.

11. The turboprop engine assembly as defined in claim 10, wherein the turbine section includes first and second turbine stages having different reaction ratios from one another.

12. The turboprop engine assembly as defined in claim 10, wherein the exhaust duct extends through a portion of the air duct from a location upstream of the heat exchanger to a location downstream of the heat exchanger.

13. The turboprop engine assembly as defined in claim 10, wherein at least part of the outlet of the air duct is selectively closable by a plurality of movable flaps.

14. The turboprop engine assembly as defined in claim 10, wherein the peripheral wall of the air duct is made of a material selected from a group consisting of: an aluminum alloy, a composite material, and a polymer.

15. The turboprop engine assembly as defined in claim 10, further comprising an additional heat exchanger in fluid communication with a cooling and lubricating system of the turboprop engine assembly and located in the air duct, at least another part of the fluid communication between the inlet and outlet of the air duct being performed through the additional heat exchanger, the liquid coolant system of the internal combustion engine being distinct from the cooling and lubricating systems of the turboprop engine assembly.

16. The turboprop engine assembly as defined in claim 10, wherein the internal combustion engine is a Wankel rotary engine including a rotor having three apex portions mounted for eccentric revolutions within an internal cavity defined in a housing, the internal cavity having an epitrochoid shape with two lobes.

17. The turboprop engine assembly as defined in claim 10, wherein a ratio of a diameter of the outlet of the exhaust duct on a diameter of the air duct in a plane transverse to the outlet of the exhaust duct is from 0.2 to 0.4.

18. A turboprop engine assembly for an aircraft, the turboprop engine assembly comprising:
   an internal combustion engine having a liquid coolant system, the internal combustion engine drivingly engaged to a propeller;
   an air duct in fluid communication with an environment of the aircraft;
   a heat exchanger received within the air duct, the heat exchanger having coolant passages in fluid communication with the liquid coolant system and air passages in heat exchange relationship with the coolant passages, the air passages in fluid communication with the air duct; and
   an exhaust duct in fluid communication with an exhaust of the internal combustion engine, the exhaust duct having an outlet positioned within the air duct downstream of the heat exchanger and upstream of an outlet of the air duct, the outlet of the exhaust duct spaced inwardly from a peripheral wall of the air duct,
   the turboprop engine assembly further comprising an additional heat exchanger received within the air duct, the additional heat exchanger having additional coolant passages in fluid communication with a cooling and lubricating system of the turboprop engine assembly and additional air passages in heat exchange relationship with the additional coolant passages and in fluid communication with the air duct, the liquid coolant system of the internal combustion engine being distinct from the cooling and lubricating system of the turboprop engine assembly.

19. The turboprop engine assembly as defined in claim 18, wherein a ratio of a diameter of the outlet of the exhaust duct on a diameter of the air duct in a plane transverse to the outlet of the exhaust duct is from 0.2 to 0.4.

20. The turboprop engine assembly as defined in claim 18, an open cross-sectional area of the outlet of the exhaust duct being smaller than an open cross-sectional area of the air duct around the outlet of the exhaust duct.

* * * * *